US005562271A

United States Patent [19]

Davis, Jr.

[11] Patent Number: 5,562,271

[45] Date of Patent: Oct. 8, 1996

[54] APPARATUS FOR MOUNTING A TRANSMISSION ON AN ENGINE STAND

[76] Inventor: William M. Davis, Jr., 8841 Flintlock Rd., Knoxville, Tenn. 37931

[21] Appl. No.: 352,535

[22] Filed: Dec. 9, 1994

[51] Int. Cl.$^{6}$ ..................................................... F16M 3/00

[52] U.S. Cl. ............................................ 248/675; 248/676

[58] Field of Search .................................... 248/666, 662, 248/674, 675, 660, 670, 676, 122.1, 130, 149, 184.1, 291.1; 269/296, 71, 69, 17; 254/DIG. 16

[56] References Cited

U.S. PATENT DOCUMENTS

| | | | |
|---|---|---|---|
| 1,283,588 | 11/1918 | Staley | 269/296 X |
| 1,373,546 | 4/1921 | Zucker | 248/675 |
| 2,602,615 | 7/1952 | Maynard et al. | |
| 2,654,147 | 10/1953 | Wilson et al. | |
| 2,913,241 | 11/1959 | Miner . | |
| 4,560,151 | 12/1985 | Grundy | 254/DIG. 16 X |
| 4,691,904 | 9/1987 | Armstrong | 254/DIG. 16 X |
| 4,705,447 | 11/1987 | Smith | 269/71 X |
| 4,771,980 | 9/1988 | Dubbs et al. | 248/662 |
| 5,141,211 | 8/1992 | Adams, Jr. | 269/69 X |
| 5,259,602 | 11/1993 | Rogos | 269/17 |

FOREIGN PATENT DOCUMENTS

| | | | |
|---|---|---|---|
| 563729 | 12/1923 | France | 248/675 |

OTHER PUBLICATIONS

Snap–On 1991–1992 Catalog, Snap–On Tools Corp., p. 276, Refer to D, E, F and G.

Mac Tools, Mac Tools, Inc., Jun. 1992 Issue, p. 333, Refer to T156B and T156BF.

"Tools and Equipment for the Professional." Catalog A–86, Sealed Power Corp., OTC Tool & Equipment Division, 1986, p. 77.

*Primary Examiner*—Ramon O. Ramirez
*Attorney, Agent, or Firm*—Pitts & Brittian, P.C.

[57] ABSTRACT

An apparatus (10) for mounting a transmission (12) to an engine stand (14). The apparatus (10) includes a pair of mounting brackets (16) which are releasably secured to the transmission (12) and to the engine stand (14). Each of the mounting brackets (16) includes a mounting arm (18) and an extension member (30). Each of the mounting arms (18) is releasably secured to the transmission (12). The mounting arm (18) is secured to the extension member (30) which is removably secured to a rotatable mounting plate (46) carried by the engine stand (14). The mounting brackets (16) are configured such that when a transmission (12) is secured thereto, and the mounting brackets (16) are secured to the engine stand (14), a centroidal axis of the transmission (40) is coincident with the axis (56) about which the engine stand mounting plate (46) rotates.

11 Claims, 2 Drawing Sheets

APPARATUS FOR MOUNTING A TRANSMISSION ON AN ENGINE STAND

This application in part discloses and claims subject matter disclosed in my earlier filed pending application, Ser. No. 08/042,624 filed on Apr. 5, 1993, now abandoned.

TECHNICAL FIELD

This invention relates to the field of transmission repair. More specifically, this invention relates to a device for mounting a selected transmission on an engine stand such that it may be easily manipulated while being repaired.

BACKGROUND ART

In the field of automobile repair, it is well known that transmissions are difficult to repair due to their shape, size and weight. When repairing a transmission, the transmission is typically removed from the vehicle. In order to work on the transmission, it must be stabilized to prevent it from moving.

Common devices used for stabilizing the transmission for repair are Model Nos. CES2B1, CES2B2, CES3C, and CES5 shown on page 276 of the Snap-on Worldwide 1991–1992 catalog, Snap-on Tools Corporation, Kenosha, Wisc., 53141–1410, issued April, 1991, and the Model No. T156B Transmission Holding Fixture shown on page 333 of the Mac Tools, Inc. Product Catalog, Mac Tools, Inc., Washington Court House, Ohio, 43160 issued June, 1992. These devices are designed to be mounted on a workbench, which inherently is immobile. The transmission is mounted to the fixture for repair purposes. The Model T156B fixture is described as being capable of being rotated 360°, with positive stops every 90°. Though the transmission may be rotated, it is obvious from the orientation of the transmission with respect to the fixture that the weight of the transmission prohibits easy rotation of the transmission. Specifically, a centroidal axis of the transmission parallel to the axis of rotation of the transmission is far removed from that axis of rotation.

As implied in the description of the T156B fixture, it is often desireable to manipulate the transmission in various orientations during the repair process. However, with devices such as those disclosed by Snap-on and Mac, manipulation can only be safely performed by two or more persons, again due to the size and weight of the transmission.

Devices such as those disclosed by Snap-on and Mac also create additional problems when employed. Specifically, these types of devices deploy the transmission in a cantilevered position away from the support surface of the workbench. Although larger workbenches may be capable of counteracting the cantilever moments created by such deployment, smaller workbenches will topple under the weight of the transmission.

Several mounting stands have been developed to mount various engines and other parts requiring assembly or repair. Typical of the art are those devices disclosed in the following US Letters Patents and foreign patent:

| Pat. No. | Inventor(s) | Issue Date |
|---|---|---|
| 1,283,588 | J. H. Staley | Nov 5, 1918 |
| 1,373,546 | G. F. Zucker | Apr 5, 1921 |
| 2,602,615 | K. W. Maynard, et al. | Jul 8, 1952 |
| 2,654,147 | F. C. Wilson, et al. | Oct 6, 1953 |
| 2,913,241 | R. F. Miner | Nov 17, 1959 |

-continued

| Pat. No. | Inventor(s) | Issue Date |
|---|---|---|
| 4,705,447 | N. R. Smith | Nov 10, 1987 |
| 4,771,980 | R. J. Dubbs, et al. | Sep 20, 1988 |
| 5,141,211 | J. E. Adams, Jr. | Aug 25, 1992 |
| 563,729 | France | Dec 12, 1923 |

Of these devices, Zucker ('546) discloses an engine support clamp for mounting an engine to the frame of an automobile. Such a device does not teach the securement of an automobile transmission to an engine stand. Furthermore, such a device does not teach the portability of or ease of access to an automobile transmission when mounted on an engine stand.

Adams, Jr. ('211) teaches a universal work station whereby several different interchangeable work support attachments are provided. However, Adams, Jr., does not teach a device for mounting an automobile transmission to an engine stand.

The '447 patent issued to Smith discloses a device for positioning an electronic test head of a test system with respect to an electronic device handler. Smith does not disclose a device for mounting an automobile transmission on an engine stand. Nor does Smith teach the portability of or accessibility to a transmission when so mounted.

While these devices disclose a means for mounting or supporting particular objects, it is known by those skilled in the art of transmission repair that such devices are not well suited for such use. Particularly, automobile transmissions range in weights to a limit which is typically unmanageable by a single mechanic. Thus, the use of such devices for mounting a transmission thereupon in order to facilitate easy access during the repair of the transmission is not possible. To mount a transmission on, for example, the Smith ('447) or Adams, Jr. ('211) devices, if such devices do not fail due to the load, would render the transmission unmovable by a single mechanic. Further, if the transmission were to be rotated, when released it would return to its original orientation.

The '147 patent issued to Wilson, et al., discloses a device for mounting something other than an engine on an engine stand. However, the use of this type of device results in the creation of tilting moments, as was the problem with cantilevered fixtures mounted on stationary workbenches. This is made evident by the floor engaging prop provided for counteracting tilting moments.

The device disclosed in the '615 patent issued to Maynard, et al., is used for suspending engines. There are no provisions for the mounting of an engine or other part thereupon. Those devices disclosed in the '241 and '980 patents are designed for being permanently secured to a support surface. They are not intended for portable use.

Specifically, Dubbs, et al. ('980), teach a stand and support for small engines. The support is mounted to a floor or a workbench. As discussed by Dubbs, et al., the '980 device is provided for mounting small motors, generators, and air compressors to a frame which is then pivotally secured to a bracket using a pair of telescoping members. The frame includes a pair of engine support members, the first of which is permanently secured, while the second engine support member is slidably engaged. An engine is secured to the top side of the frame, with the axis of rotation of the entire assembly being below and to one side of the centroidal axis of the engine. In order to prevent rotation of the engine, one of the telescoping members is provided with four openings, each of which is dimensioned to cooperate with a single opening defined by the telescoping member to receive a pin when in a particular orientation. Therefore, there are four positions in which the frame and motor assembly may be oriented and locked. If the pin is removed, the assembly will tend to rotate such that the motor is closest to the ground, thus actually yielding a fifth, unlocked position.

Staley ('588) discloses a stand for a gas engine which includes a pair of side frames, each pivotally carrying a plate to which is secured a support bar. An engine is secured to both of the support bars and is interposed between the side frames. Staley does not teach the coincidence of the axis of rotation and the centroidal axis of the engine. Nor does Staley teach the balancing of the weight of the engine. Staley does provide a means for locking the orientation of the engine in one of a finite (twelve are illustrated) positions, which is required due to the exclusivity of the axis of rotation and the centroidal axis of the engine. Further, because the engine is mounted on the Staley device between two frame portions, as opposed to being cantilevered, access to the engine is limited.

Therefore, it is an object of this invention to provide a means for mounting a transmission on an engine stand.

Another object of the present invention is to provide such a device which allows for the easy manipulation of the transmission when mounted.

Still another object of the present invention is to provide such a device whereby the axis of rotation of the device and the centroidal axis of the transmission are coincident when the transmission is mounted on the device, thereby allowing the device and transmission to be easily rotated to any orientation without requiring excessive force.

Another object of the present invention is to provide a device such that a transmission may be accessed from any side thereof to perform repair work thereon.

Still another object of the present invention is to provide such a device which is easily portable.

Yet another object of the present invention is to provide such a means without requiring the addition of tilt counteracting devices.

Still another object of the present invention is to provide a device for supporting a transmission for repair work, the transmission being held in a substantially stable manner in any selected position thereby providing added safety during repair.

DISCLOSURE OF THE INVENTION

Other objects and advantages will be accomplished by the present invention which is designed to adapt a conventional engine stand for the mounting of a selected transmission such that the transmission may be easily manipulated for repair. The apparatus of the present invention is comprised substantially of a pair of brackets for the attachment of the transmission and the securement to the selected engine stand. Each of the brackets of the preferred embodiment includes a mounting arm and an extension member. The mounting arm includes an angle member having first and second legs, the first of which defines a plurality of openings. The openings are dimensioned and positioned to cooperate with openings defined by the transmission housing to enable securement of the transmission to the engine stand. The second leg of the angle member is provided to strengthen the first leg to overcome the torsion forces applied thereto by the transmission. The leading edge of the first leg of each mounting arm is configured to conform to the perimeter of the transmission housing.

Each bracket is provided with an extension member to which the respective mounting arm is secured. The mounting arm of the preferred embodiment is secured at a first end of the extension member, with the second end thereof being removably secured to a rotatable mounting plate carried by the engine stand. An opening is defined proximate a second end of each of the left and right bracket extension members for receiving a connector such as a bolt. The connector is further received by the mounting plate provided on the engine stand, thereby allowing for the mounting of the brackets thereto.

The opening defined by the extension member is positioned such that when a transmission is secured to the brackets and the brackets are secured to the engine stand, a centroidal axis of the transmission is coincident with the axis about which the engine stand mounting plate rotates. By providing the coincidence of the transmission centroidal axis and the axis of rotation, the rotation of the transmission is accomplished with relative ease.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

Figure 1:
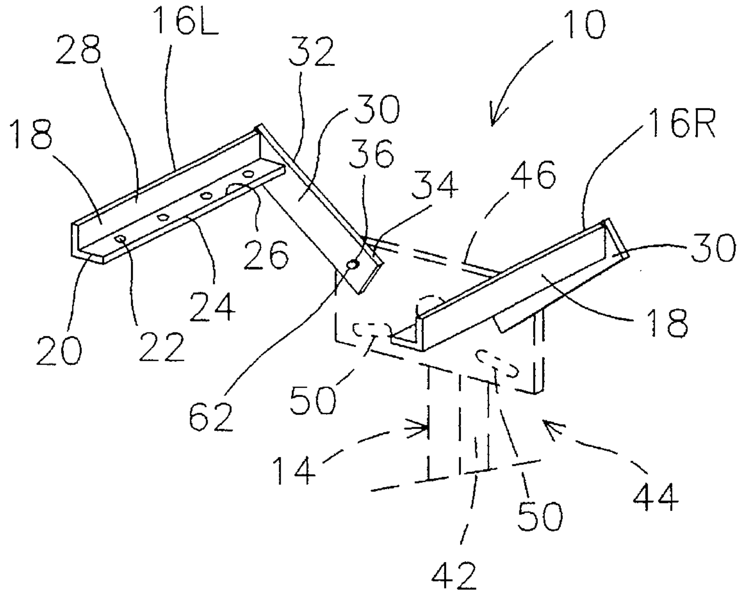
FIG. 1 is a perspective view of the apparatus for mounting a transmission to an engine stand constructed in accordance with several features of the present invention.
Figure 3:
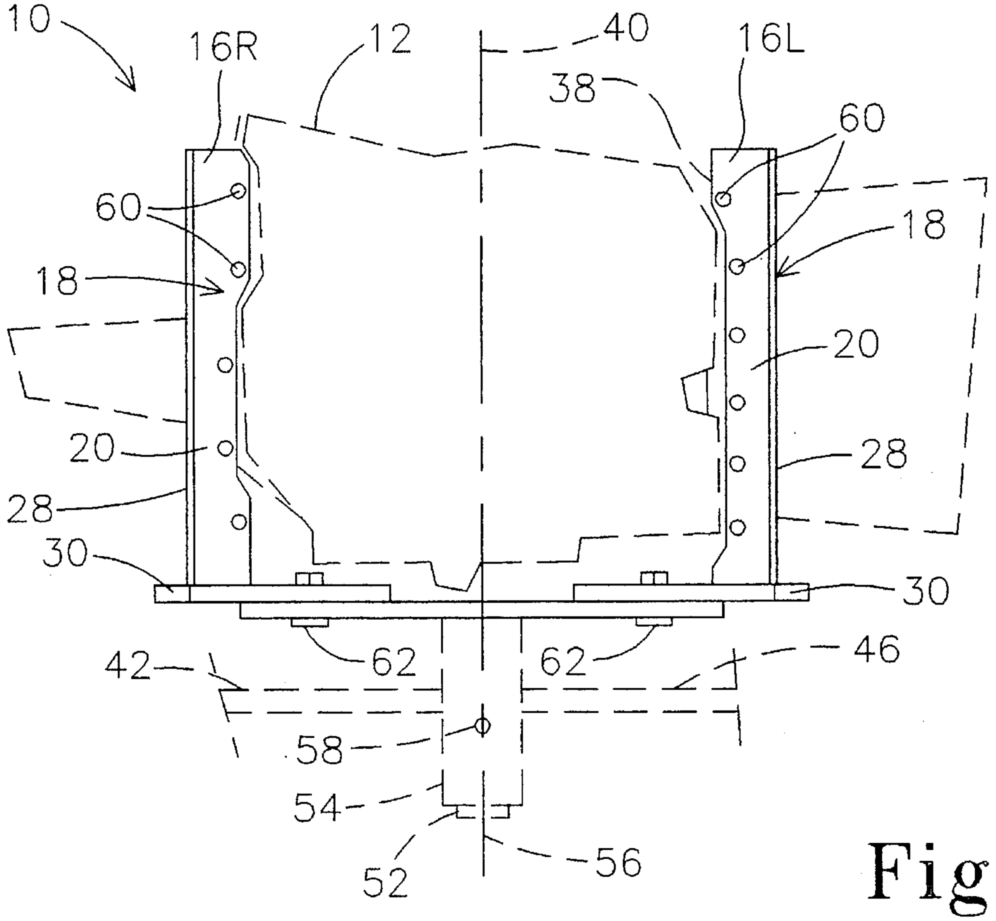
FIG. 3 is a top plan view of the apparatus of FIG. 1 showing the apparatus secured to an engine stand and a transmission secured thereto.
Figure 2:
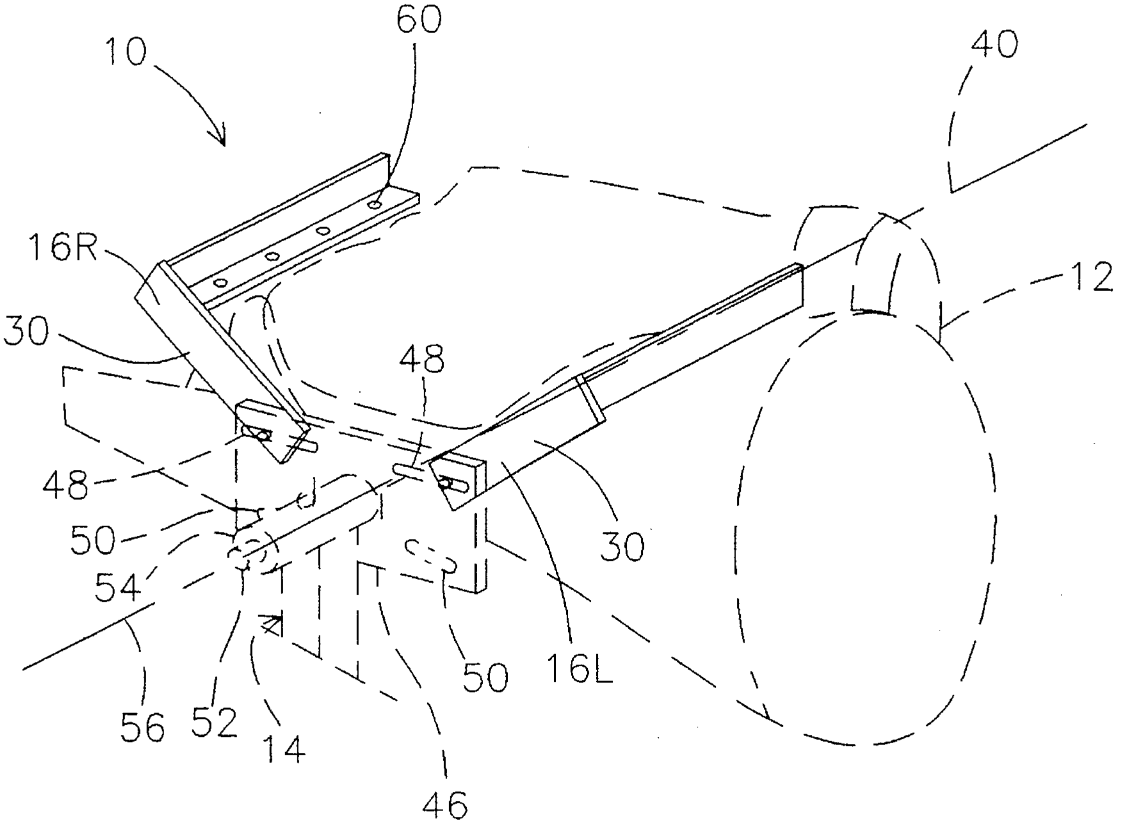
FIG. 2 illustrates a perspective view of 10 the apparatus of FIG. 1 showing the apparatus secured to an engine stand and a transmission secured thereto.

An apparatus for mounting a transmission to an engine stand incorporating various features of the present invention is illustrated generally at 10 in the figures. The apparatus 10 is designed to adapt a conventional engine stand 14 for the mounting of a selected transmission 12 such that the transmission 12 may be easily manipulated for repair. Moreover, in the preferred embodiment the apparatus 10 is designed to be adaptable to a plurality of transmission configurations.

The apparatus 10 of the present invention is comprised substantially of a pair of mounting brackets 16 for the attachment of the transmission 12 and the securement to the selected engine stand 14. The mounting brackets 16 are substantially mirror images one of the other and may be hereinafter referred to as the left and right mounting brackets 16L, R.

Each of the mounting brackets 16 of the preferred embodiment includes a mounting arm 18 and an extension member 30. The mounting arm 18 includes at least a substantially planar member 20 defining a plurality of openings 22 for cooperating with a plurality of openings 38 defined by the transmission housing 12 to receive a corresponding plurality of connectors 60 such as bolts. Thus, the mounting arms 18 may be securely fastened to the transmission housing 12. As illustrated, the left and right mounting brackets 16L, R are secured to the transmission 12 such that when secured, the substantially planar member 20 of each is substantially co-planar with and parallel to the other.

In the preferred embodiment, the mounting arms 18 are fabricated from a material such as angle iron defining first and second leg members 20, 28, the first leg member 20 defining the substantially planar member secured to the transmission 12. The second leg 28 defines a second substantially planar member which serves to strengthen the first substantially planar member 20 when the selected transmission 12 is attached thereto and the mounting brackets 16 are attached to the engine stand 14. Thus, the second legs 28 serve to prevent torsion failure of the first legs 20.

In the preferred embodiment, the leading edge 24 of the first leg 20 of each mounting arm 18 is configured to conform to the perimeter of the transmission housing 12. Notches 26 are defined by the leading edges 24 such that the mounting arms 18 may be closely mated to the transmission housing 12. By providing the ability to closely mate the mounting arms 18 to the transmission housing 12, the need for altering existing transmission housings 12, or re-designing transmission housings 12 in the future, is obviated.

Each mounting bracket 16 is provided with an extension member 30 to which the respective mounting arm 18 is secured. The mounting arm 18 of the preferred embodiment is secured at a first end 32 of the extension member 30, with the second end 34 thereof being removably secured to a rotatable mounting plate 46 carried by the engine stand 14.

The mounting arm 18 may be secured to the extension member 30 in any conventional fashion such as by welding. In the preferred embodiment, each mounting arm 18 is oriented with respect to its associated extension member 30 such that when each of the mounting brackets 16 is mounted on the engine stand 14, the respective first legs 20 of the left and right mounting arms 18L, R may be positioned to be substantially co-planar and spaced apart to receive a selected transmission housing 12.

An opening 36 is defined proximate a second end 34 of each of the left and right bracket extension members 30L, R. Each opening 36 is provided for receiving a connector 62 such as a bolt. The connector 62 is further received by the mounting plate 46 provided on the engine stand 14, thereby allowing for the mounting of the mounting brackets 16 thereto. In the preferred embodiment, as is typical of engine stands, the openings 48 defined by the engine stand mounting plate 46 are slotted to allow for varying dimensions and configurations of engines. The slotted openings 48, when used in conjunction with the apparatus 10 of the present invention, allow for the supporting of varying dimensions and configurations of transmissions 12 as well. As illustrated, the mounting bracket 16 may include a pair of slotted openings 48 which are co-linear to each other while also providing a pair of slotted openings 50 which are disposed at a selected angle. Either configuration may be used in conjunction with the apparatus 10 of the present invention.

The opening 36 defined by the extension member 30 is positioned such that when a transmission 12 is secured to the mounting brackets 16 and the mounting brackets 16 are secured to the engine stand 14, a centroidal axis 40 of the transmission 12 is coincident with the axis 56 about which the engine stand mounting plate 46 rotates. By providing the coincidence of the transmission centroidal axis 40 and the axis of rotation 56, the rotation of the transmission 12 is accomplished with relative ease. Although the engine stand 14 shown illustrates a locking mechanism 58 for securing the rotatable mounting plate 46 in various selected positions, other locking mechanisms 58 may be incorporated to allow for the locking of the position of the transmission 12 in any selected position.

The illustrated embodiment of the mounting portion 44 of the engine stand 14 includes a mounting plate 46 defining a plurality of openings 48, 50 and carrying an axial member 52 extending substantially perpendicular therefrom. The engine stand 14 includes a substantially horizontally-oriented tube member 54 positioned and configured to receive the axial member 52 carried by the mounting plate 46. A locking mechanism 58 is provided for locking the position of the axial member 52 with respect to the tube member 54. The locking mechanism 58 provided by the engine stand 14 provides a means for securing the transmission 12 in a selected position while performing repair work on the transmission 12.

The apparatus 10 of the present invention is relatively easy to employ in order to secure the transmission 12 to the engine stand 14. After the transmission 12 has been removed from the vehicle, the left and right mounting brackets 16L, R are secured to the transmission housing 12 on opposite sides such that the left and right mounting brackets 16L, R are substantially parallel one to the other. The locking mechanism 58 is then removed from the engine stand 14 such that the mounting plate 46 and axial member 52 may be removed. The mounting plate 46 is then secured to the second ends 34 of the respective extension members 30. The transmission 12, the apparatus of the present invention 10, and the mounting plate 46 may then be lifted into place, with the axial member 52 being placed within the tube member 54 of the engine stand 14. After the axial member 52 has been placed, the transmission 12 may be freely rotated 360 degrees and secured at any selected position, as allowed by the particular locking mechanism 58. As illustrated, the transmission 12 is disposed above the engine stand 14 such that the frame 42 of the engine stand 14 withstands any moments created by the weight of the transmission 12 without requiring the addition of further stabilizing devices.

From the foregoing description, it will be recognized by those skilled in the art that an apparatus for mounting a transmission on an engine stand offering advantages over the prior art has been provided. Specifically, the apparatus provides a means for adapting a commercially-available engine stand to the securement of a selected transmission. The apparatus of the present invention is configured such that manipulation of the transmission, once secured to the engine stand, is made with relative ease. Further, as illustrated, when a transmission is secured to an engine stand using the apparatus of the present invention, the transmission is held in a cantilevered position in order to allow for the easy access to a substantial portion of the transmission while performing repair and other maintenance functions on the transmission.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention,

I claim:

1. An apparatus for mounting a transmission on an engine stand, said engine stand including a frame and a mounting plate pivotally carried by said frame and pivoting about an axis of rotation, said transmission defining a centroidal axis, said apparatus comprising:

a first mounting bracket releasably securable to the transmission and releasably securable to the engine stand mounting plate; and a second mounting bracket releasably securable to the transmission and releasably securable to the engine stand mounting plate, said first mounting bracket and said second mounting bracket each being configured such that when the transmission is releasably secured to said first mounting bracket and said second mounting bracket, the centroidal axis defined by the transmission and the axis of rotation defined by the engine stand mounting plate carried by said engine stand frame are substantially coincidental, and such that the centroidal axis defined by the transmission and the axis of rotation are substantially parallel to a portion of said first mounting bracket and said second mounting bracket at which said transmission is releasably secured, the transmission thus being disposed in a cantilevered orientation.

2. The apparatus of claim 1 wherein said first mounting bracket and said second mounting bracket each include an extension member and a mounting arm, said extension member being secured to said mounting arm, said mounting arm being releasably secured to the transmission, said extension member being releasably secured to the engine stand mounting plate, said extension member and said mounting arm being secured one to the other in a selected manner, the centroidal axis defined by the transmission and the axis of rotation being substantially parallel to at least a portion of said mounting arm.

3. The apparatus of claim 2 wherein said mounting arm includes a first substantially planar member and a second substantially planar member secured to said first substantially planar member at a selected angle thereto, said first substantially planar member defining a plurality of openings configured and positioned to cooperate with a plurality of openings defined by the transmission, each of said plurality of openings being dimensioned to receive a connector for releasably securing the transmission to said first substantially planar member.

4. The apparatus of claim 3 wherein said first substantially planar member defines an edge having a configuration substantially similar to a corresponding portion of a perimeter of the transmission to facilitate close receipt of said first substantially planar member by the transmission.

5. An apparatus for mounting a transmission on an engine stand, said engine stand including a frame and a mounting plate pivotally carried by said frame and pivoting about an axis of rotation, the transmission defining a centroidal axis, said apparatus comprising:

a first mounting bracket releasably securable to the transmission and releasably securable to the engine stand mounting plate; and a second mounting bracket releasably securable to the transmission and releasably securable to the engine stand mounting plate, said first mounting bracket and said second mounting bracket each being configured such that when the transmission is releasably secured to said first mounting bracket and said second mounting bracket, the centroidal axis defined by the transmission and the axis of rotation defined by the engine stand mounting plate carried by said engine stand frame are substantially coincidental, said first mounting bracket and said second mounting bracket each including an extension member and a mounting arm, said extension member being secured to said mounting arm, said mounting arm being releasably secured to the transmission, said extension member being releasably secured to the engine stand mounting plate, said extension member and said mounting arm being secured one to the other in a selected manner, the centroidal axis defined by the transmission and the axis of rotation being substantially parallel to at least a portion of said mounting arm, the transmission thus being disposed in a cantilevered orientation.

6. The apparatus of claim 5 wherein said mounting arm includes a first substantially planar member and a second substantially planar member secured to said first substantially planar member at a selected angle thereto, said first substantially planar member defining a plurality of openings configured and positioned to cooperate with a plurality of openings defined by the transmission, each of said plurality of openings being dimensioned to receive a connector for releasably securing the transmission to said first substantially planar member.

7. The apparatus of claim 6 wherein said first substantially planar member defines an edge having a configuration substantially similar to a corresponding portion of a perimeter of the transmission to facilitate close receipt of said first substantially planar member by the transmission.

8. An apparatus for mounting a transmission on an engine stand, said engine stand including a frame and a mounting plate pivotally carried by said frame and pivoting about an axis of rotation, the transmission defining a centroidal axis, said apparatus comprising:

a first mounting bracket releasably securable to the transmission and releasably securable to the engine stand mounting plate, said first mounting bracket including an extension member and a mounting arm, said extension member being secured to said mounting arm, said mounting arm being releasably secured to the transmission, said extension member being releasably secured to the engine stand mounting plate, said extension member and said mounting arm being secured one to the other in a selected manner; and a second mounting bracket releasably securable to the transmission and releasably securable to the engine stand mounting plate, said second mounting bracket including an extension member and a mounting arm, said extension member being secured to said mounting arm, and said mounting arm being releasably secured to the transmission, said extension member being releasably secured to the engine stand mounting plate, said extension member and said mounting arm being secured one to the other in a selected manner, the transmission thus being disposed in a cantilevered orientation.

9. The apparatus of claim 8 wherein said first mounting bracket and said second mounting bracket are each configured such that when the transmission is releasably secured to said first mounting bracket and said second mounting bracket, the centroidal axis defined by the transmission and the axis of rotation defined by the engine stand mounting plate carried by said engine stand frame are substantially coincidental, and the centroidal axis defined by the transmission and the axis of rotation are substantially parallel to at least a portion of said mounting arm of each of said first mounting bracket and said second mounting bracket.

10. The apparatus of claim 8 wherein said mounting arm includes a first substantially planar member and a second substantially planar member secured to said first substantially planar member at a selected angle thereto, said first substantially planar member defining a plurality of openings configured and positioned to cooperate with a plurality of openings defined by the transmission, each of said plurality of openings being dimensioned to receive a connector for releasably securing the transmission to said first substantially planar member.

11. The apparatus of claim 10 wherein said first substantially planar member defines an edge having a configuration substantially similar to a corresponding portion of a perimeter of the transmission to facilitate close receipt of said first substantially planar member by the transmission.

* * * * *